United States Patent [19]

Schiffelbein

[11] 4,007,821
[45] Feb. 15, 1977

[54] CONCRETE DELIVERY APPARATUS

[76] Inventor: Richard A. Schiffelbein, 3727 SE. 21st St., Topeka, Kans. 66605

[22] Filed: May 5, 1975

[21] Appl. No.: 574,745

[52] U.S. Cl. .................................. 193/4; 193/10
[51] Int. Cl.² .................................. B65G 11/02
[58] Field of Search .............. 193/2 R, 4, 5, 6, 10, 193/25 R, 25 A, 25 B, 25 C; 198/64, 93, 213; 298/7; 222/527

[56] References Cited

UNITED STATES PATENTS

| 180,769 | 8/1876 | Iske | 193/4 X |
|---|---|---|---|
| 3,035,682 | 5/1962 | Ferch | 198/64 |
| 3,074,534 | 1/1963 | Thiele | 198/64 X |
| 3,176,833 | 4/1965 | Wilkes | 198/64 X |
| 3,746,140 | 7/1973 | Schiffelbein | 193/5 |

FOREIGN PATENTS OR APPLICATIONS 2,051,298 4/1972 Germany .................. 193/2 R

*Primary Examiner*—Evon C. Blunk
*Assistant Examiner*—James L. Rowland
*Attorney, Agent, or Firm*—Robert E. Breidenthal

[57] ABSTRACT

A lightweight and reinforced tubular concrete distributing structure having an integral hopper at one end as well as flexible means for supporting the same on a delivery chute to receive the discharge of the latter. The bottom wall of the hopper merges smoothly with the interior of the tubular structure and the plane of the top edges of the hopper is inclined to the longitudinal axis of the tubular structure.

1 Claim, 6 Drawing Figures

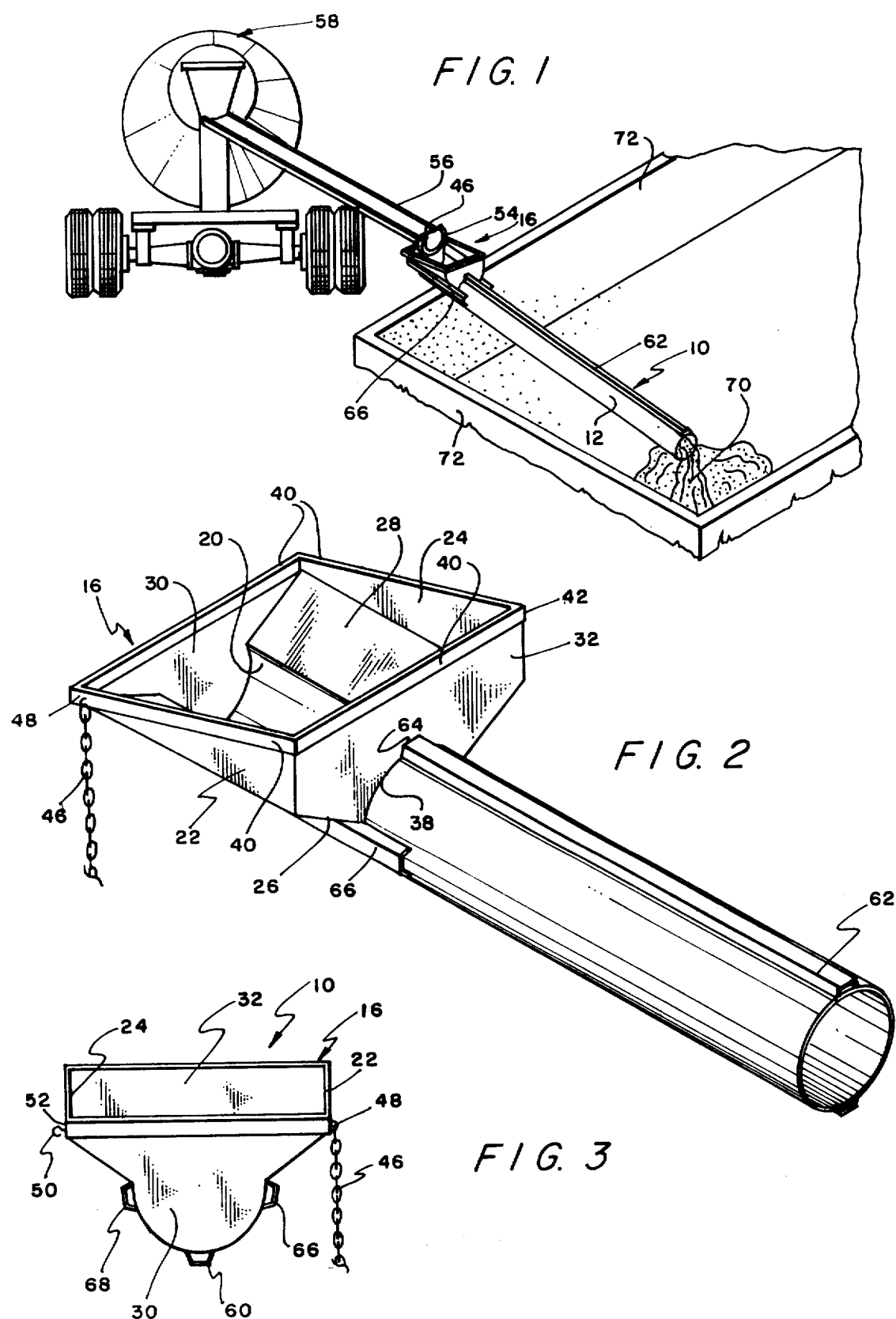

CONCRETE DELIVERY APPARATUS

The present invention relates to new and useful improvements in accessories for mobile concrete mixers for facilitating delivery of concrete to its point of use in construction work.

More particularly, the invention pertains to a rigid dispensing extender attachment for the usual mixer truck delivery chute for use in lieu of the attachment disclosed in my U.S. Pat. No. 3,746,140, entitled Concrete Delivery Chute Attachment, when a greater reach is desired.

Concrete construction work often entails the placement of concrete at locations beyond the reach of the extensible trough sections of the mixer trucks, and this entails the use of wheelbarrows and the like, laying down walkways to pass safely over or around the often cluttered or obstructed ground about a construction site, and causes unnecessary delay for the mixer truck.

Then, too, there are frequent occasions where it is possible to manouver a mixer truck within its delivery reach, but only at the price of having to move the truck over lawns or parking or sidewalks that cannot withstand the great weight of such concrete mixer trucks.

It is the primary object of this invention to provide such additional reach for concrete mixer trucks as to avoid many instances of inability to deliver by gravity simply for the reason that the extensible and usually hydraulically manipulatable trough delivery system of conventional mixer trucks lacks sufficient reach.

In accordance with the above object, it is a further object of this invention to provide substantial additional reach in lightweight form that can be easily carried to and from construction sites by a contractor doing concrete work and kept in a convenient state of readiness for single-man usage on the arrival of a concrete mixer truck.

An appreciation of related prior art proposals can be easily obtained on reference to the following U.S. Pat. Nos: 747,374, Cherne et al., Dec. 22, 1903; 1,230,820, Levalley et al., June 19, 1917; 1,946,222, Mandt, Feb. 6, 1934; 1,946,760, Rhine, Feb. 13, 1934; 2,096,889, Evenson, Oct. 26, 1937; 3,072,371, Doyle, Jan. 8, 1963; 3,157,262, Chapdelaine, Nov. 17, 1964; 3,633,879, Prichard, Jan. 11, 1972.

Broadly, the present invention comprises a concrete delivery accessory for use with the discharge chute of conventional concrete mixer trucks comprising an elongated tubular member having an inlet and an outlet respectively at its front and rear ends, said inlet end of the tubular member being sealingly fixed to and opening into the rear end of an upstanding and open-topped hopper having a bottom wall, said tubular member being of cylindrical configuration with a semicylindrical forwardly projecting extension thereof constituting the bottom wall of the hopper, said bottom wall having a semicircular forward edge sealingly secured to an upstanding front end wall, said hopper including a rear end wall sealingly secured to the front end of the tubular member and projecting upwardly therefrom, said hopper additionally including a pair of upwardly divergent side walls having front and rear edges sealingly secured to the front and rear walls of the hopper and also having lower edges sealingly secured to upper edges of the semicylindrical bottom wall, and means carried by the hopper adjacent the front end adapted for detachably suspending the same from a concrete delivery chute.

In other language, the instant invention entails a concrete delivery accessory for use with the discharge chute of conventional concrete mixer trucks comprising an elongated horizontal hollow cylinder having an integral semicylindrical extension of its lower half at the forward end thereof, an upstanding front end wall sealingly secured to the front end of the semicylindrical extension, an upstanding rear end wall sealingly secured to the forward end of the upper half of the hollow cylinder and extending thereabove, and upwardly divergent side walls extending upwardly from diametrically opposed upper side edges of the extension and having forward and rear ends sealingly secured to said front and rear end walls, with the extension, the end walls and the side walls being so constructed and arranged to constitute a hopper having a bottom defined by the extension for unobstructed discharge of the hopper into the hollow cylinder.

The invention will be best understood in the light of the following description of a preferred embodiment of the invention, such description being given in conjunction with the accompanying drawings, wherein:

FIG. 1 is an isometric view of the invention showing the same in use with the hopper thereof shown suspended from the delivery chute of a concrete mixer truck;

FIG. 2 is an enlarged and fragmentary forward looking isometric showing of the hopper end of the dispensing accessory of the invention;

FIG. 3 is a front elevation of the accessory;

Figure 4:
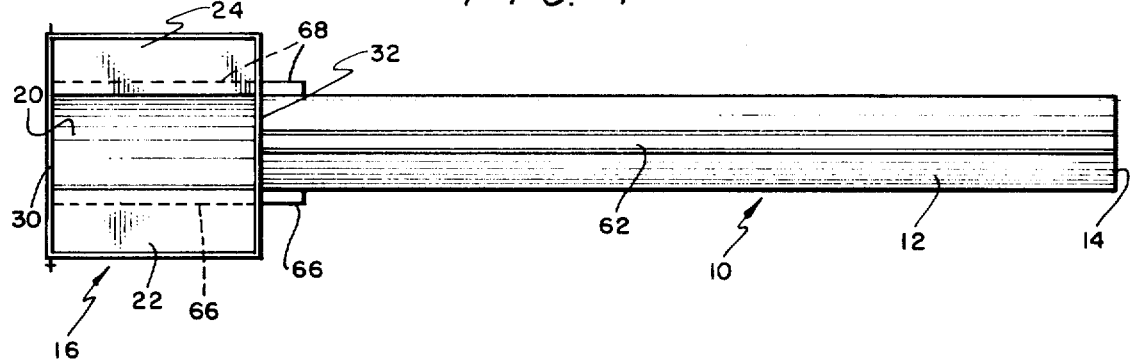
FIG. 4 is a top plan view of the accessory.
Figure 5:
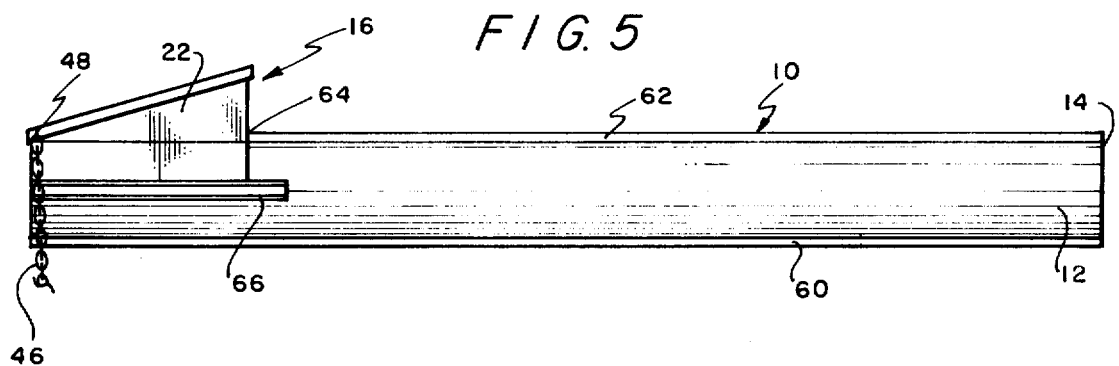
FIG. 5 is a side elevation of the accessory.
Figure 6:
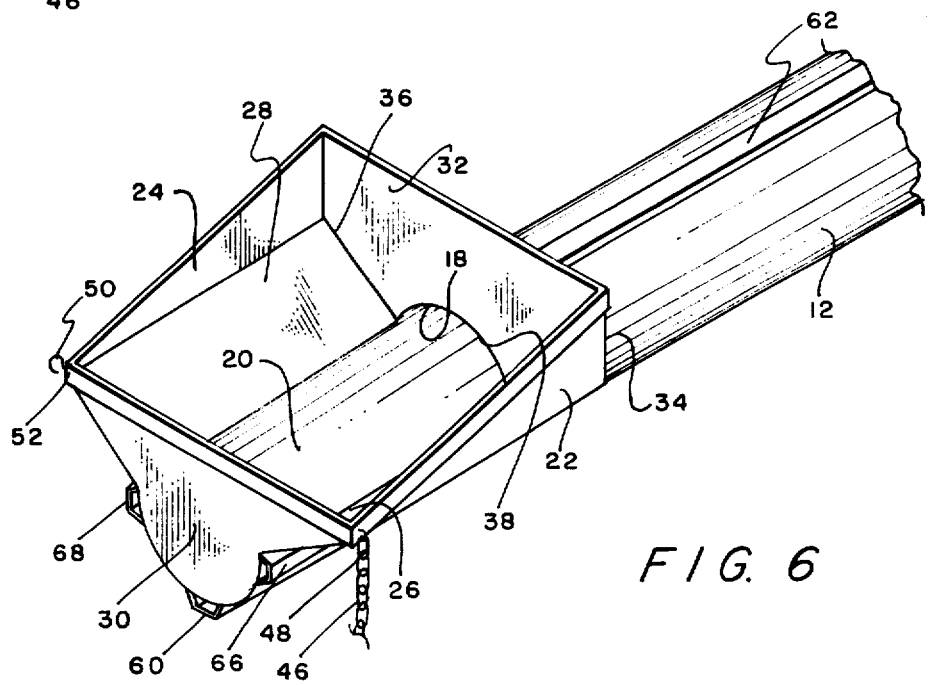
FIG. 6 is an enlarged and fragmentary rearward looking isometric view of the hopper end of the accessory.

Referring now to the drawings wherein like numerals designate like parts throughout the various views, the numberal 10 designates the dispensing accessory generally, the same being comprised of an elongated tubular member or hollow circular cylinder 12 having an open rear or discharge end 14 and a hopper construction designated generally at 16 for feeding an open inlet or front end 18 of the tubular member 12.

The hopper 16 comprises the lower half of the tubular member 12 having an integral semicylindrical forwardly projecting extension or continuation 20 to constitute the bottom wall of the hopper 16, and it is emphasized at this point that material can flow gravitationally on such bottom wall 20 and into tubular member 12 through the inlet 18 of the latter without the underside of such material encountering any obstruction or having to suffer any transverse deformation. The upper edges of the bottom wall 20 merge with side walls 22 and 24 that are in their lowermost extents upwardly divergent as shown at 26 and 28.

The hopper 16 includes an upstanding front wall 30 that joins and is sealed to the forward edges of the bottom and side walls 20, 22 and 24. As shown, the vertical height of the front wall 30 is preferably only such as to be modestly greater than the diameter of the tubular member 12, whereas an upstanding rear wall 32 sealingly secured at 34 and 36 to the rear edges of the side walls and about the forward edge of the upper half of the tubular member 12 at 38 extends substantially above the top of the tubular member 12 as shown.

The upper edges of the side walls 22 and 24, and the end walls 30 and 32 terminate in a common plane that is forwardly and downwardly inclined relative to the tubular member 12, and all such upper edges are preferably doubly bent outwardly upon themselves to form beads as shown at 40 to reinforce such hopper walls. Preferably also, the junctures of such beads 40 are suitably secured or joined as at 42 to further strengthen the structure and to minimize the existence of any sharp protrusions that might constitute a source of potential injury to workers handling the accessory 10.

It will be evident that the structure thus far described has a vertical plane of symmetry coincident with the axis of the tubular member.

The plane common to the beaded upper edges of the hopper 16 has an inclination to the tubular member 12 such that a concrete mixture of average flowability will gravitationally slide down the inside of the latter when such plane is about horizontal. The angle of inclination can be about 15° as shown. If desired, such angle can be slightly less or considerably greater.

One end of a metal chain 46 has one end fixedly secured to the front upper and beaded edge of the side wall 22 at 48, and for coaction with the open links of such chain 46 is a downwardly opening metal hook 50 fixed to the forward upper and beaded edge of the side wall 24 at 52. The arrangement is such that (see FIG. 1) the chain can be passed over the top of the discharge end 54 of the delivery chute 56 of a conventional concrete mixer truck designated generally at 58 and releasably retained with the hook 50 being passed through one of the links of the chain 46.

The chute 56 is conventional and has upstanding lugs, not shown, at its opposite sides at its discharge end 54 and the arrangement is such that the chain 46 cannot slip off the same. The mixer truck 58 is conventional and includes hydraulic power means, not shown, to position and to support the chute 56 as desired. As suspension of the accessory 10 and concrete therein can constitute a considerable load on the chute 56, it will be evident to those skilled in the art that a cradle, A-frame, or some suitable form of prop, not shown, can be supportingly positioned under the chute 56 adjacent its discharge end.

Inasmuch as the accessory 10 should be as light in weight as possible, commensurate with durability, the tubular member 12 and the walls of the hopper 16 are as thin walled as possible; however, this entails the possibility of impractical weakness at the juncture of the hopper 16 with the tubular member 12 as well as undesirable flexing along the length of the latter.

The aforementioned weakness and undesired flexibility are conveniently overcome without undue increase in weight by the provision of a channel-shaped rib 60 fixed to the center underside of the accessory 10 and secured thereto along the entire extent of the tubular member 12 and its extension constituting the bottom wall 20 of the hopper 16. A similar rib is secured centrally along the top of the entire extent of the tubular member 12 and the front end of the rib 62 is attached to the rear hopper wall 32 at 64.

A pair of similar, though shorter, ribs 66 and 68 are secured to exteriors of the upper and diametrically opposed sides of the bottom wall 20 and are extended rearwardly to overlap and are secured to tubular member 12 as shown. Though the ribs 66 and 68 are close to the neutral axis of the accessory, they do not contribute greatly to the resistance against bending moments of the concrete load, but they oppose torsional twisting and any spreading of the hopper side walls 22 and 24.

The accessory 10 is of all metallic construction and all joints, seams or sealing are preferably by welding. Each rib is attached along two lines of contact, and while each line of contact is preferably a continuous bead of welding, such welding can be at spaced intervals as should be manifest to those skilled in the art. The junctures of the beads or hems at the upper edge of the hopper are also welded. The material of construction can be steel; however, the use of aluminum is preferred because of its light weight.

Also, assuming facilities for welding aluminum are available, aluminum tubing suitable for the member 12 is readily available in many localities in adequate diameter, suitable wall thickness, and length as agricultural irrigation pipe.

The value and use of the accessory 10 should be manifest to any concrete contractor, particularly in view of the application of the same to delivering concrete 70 in the pouring of concrete to form a basement floor circumscribed by foundation walls 72.

Concrete 70 pours from the chute 56 to enter the hopper 16 and then, without obstruction, the concrete flows to a relatively remote point of use through the tubular member 12.

The character of the suspension of the hopper 16 by the chain 46 is inherently flexible and therefore enables the user to manipulate the discharge end 14 over a substantial arc without having to move the chute 56.

Reference is now directed to the appended claims.

I claim:

1. A concrete delivery accessory for use with the discharge chute of conventional concrete mixer trucks comprising an elongated tubular member having an inlet and an outlet respectively at its front and rear ends, said inlet end of the tubular member being integrally and sealingly fixed to and opening into the rear end of an upstanding and open-topped rigid hopper having a bottom wall, said tubular member being of circular cylindrical configuration with a semicylindrical forwardly projecting extension thereof constituting the bottom wall of the hopper, said bottom wall having a semicircular forward edge sealingly secured to an upstanding front end wall, said hopper including a rear end wall sealingly secured to the front end of the tubular member and projecting upwardly therefrom, said hopper additionally including a pair of upwardly divergent side walls having front and rear edges sealingly secured to the front and rear walls of the hopper and also having lower edges sealingly secured to upper edges of the semicylindrical bottom wall, said tubular member and the semicylindrical extension thereof having interiors entirely free of obstructions whereby gravitational flow of material from the hopper to the tubular member is subject to only minimal opposition, means carried by the hopper for detachably suspending the same from a concrete delivery chute, said front, rear and side walls having upper edges that terminate in a rectangular configuration in a common plane that is forwardly and downwardly inclined relative to the tubular member, and said means for suspending the hopper comprising an elongated flexible element having one end secured to one side of the hopper and its other end detachably secured to the other side of the hopper.

* * * * *